United States Patent
Thesen

(10) Patent No.: US 6,640,018 B1
(45) Date of Patent: Oct. 28, 2003

(54) METHOD FOR ROTATING IMAGE RECORDS WITH NON-ISOTROPIC TOPICAL RESOLUTION

(75) Inventor: Stefan Thesen, Meckenheim (DE)

(73) Assignee: Siemens Aktiengesellschaft, Münich (DE)

( * ) Notice: Subject to any disclaimer, the term of this patent is extended or adjusted under 35 U.S.C. 154(b) by 595 days.

(21) Appl. No.: 09/587,855

(22) Filed: Jun. 6, 2000

(30) Foreign Application Priority Data

Jun. 8, 1999 (DE) .......................................... 199 26 097
Jul. 13, 1999 (DE) .......................................... 199 32 631

(51) Int. Cl.$^7$ ................................................ G06K 9/32
(52) U.S. Cl. ...................... 382/296; 382/131; 382/280; 345/649
(58) Field of Search .................... 382/280, 295, 382/296, 300, 154, 131; 378/21; 345/126, 649, 656

(56) References Cited

U.S. PATENT DOCUMENTS 4,843,631 A * 6/1989 Steinpichler et al. ....... 382/280
4,850,028 A   6/1989 Kawamura et al.
5,568,600 A * 10/1996 Kaba ........................... 345/648

FOREIGN PATENT DOCUMENTS

DE    36 29 984    7/1989

OTHER PUBLICATIONS

Eddy et al., "Improved Image Registration by Using Fourier Interpolation", *MRM 36*, 1996, pp. 923–931.
"Algorithm for Rotating an Image by Shearing", *IBM Technical Disclosure Bulletin*, vol. 31, No. 2, Jul. 1988, pp. 389–391.

* cited by examiner

*Primary Examiner*—Bhavesh M. Mehta
*Assistant Examiner*—Ali Bayat
(74) *Attorney, Agent, or Firm*—Schiff Hardin & Waite

(57) ABSTRACT

A method for rotating at least two-dimensional image records with non-isotropic topical resolution, in which a rotation of an image record is described using a rotation matrix; the rotation matrix is represented as a product of at least two shear matrices, each having exactly one element that is dependent on the angle of rotation, while their remaining elements are exclusively ones and zeroes; the matrix element, which is dependent on the angle of rotation, of at least one shear matrix is multiplied by a factor; and the rotation of the image record is carried out in Fourier space without interpolations and without forming an isotropic auxiliary record, by exploiting the displacement set of the Fourier transformation by implementing the shear matrices as displacements of line elements of the image record.

5 Claims, 2 Drawing Sheets

Non-isotropic three-dimensional image record

Calculation of the rotation in Fourier space; Operation description by a product of three products of three 3x3 shear matrices:

$[A_{3D\beta mod} \cdot B_{3D\beta mod} \cdot A_{3D\beta mod}] \cdot [A_{3D\gamma mod} \cdot B_{3D\gamma mod} \cdot A_{3D\gamma mod}] \cdot [A_{3D\delta mod} \cdot B_{3D\delta mod} \cdot A_{3D\delta mod}] =$ $$\left[ \begin{bmatrix} 1 & -b\cdot\tan\frac{\beta}{2} & 0 \\ 0 & 1 & 0 \\ 0 & 0 & 1 \end{bmatrix} \cdot \begin{bmatrix} 1 & 0 & 0 \\ \frac{1}{b}\cdot\sin\beta & 1 & 0 \\ 0 & 0 & 1 \end{bmatrix} \cdot \begin{bmatrix} 1 & -b\cdot\tan\frac{\beta}{2} & 0 \\ 0 & 1 & 0 \\ 0 & 0 & 1 \end{bmatrix} \right] \cdot$$

$$\left[ \begin{bmatrix} 1 & 0 & -c\cdot\tan\frac{\gamma}{2} \\ 0 & 1 & 0 \\ 0 & 0 & 1 \end{bmatrix} \cdot \begin{bmatrix} 1 & 0 & 0 \\ 0 & 1 & 0 \\ \frac{1}{c}\cdot\sin\gamma & 0 & 1 \end{bmatrix} \cdot \begin{bmatrix} 1 & 0 & -c\cdot\tan\frac{\gamma}{2} \\ 0 & 1 & 0 \\ 0 & 0 & 1 \end{bmatrix} \right] \cdot$$

$$\left[ \begin{bmatrix} 1 & 0 & 0 \\ 0 & 1 & -\frac{c}{b}\cdot\tan\frac{\delta}{2} \\ 0 & 0 & 1 \end{bmatrix} \cdot \begin{bmatrix} 1 & 0 & 0 \\ 0 & 1 & 0 \\ 0 & \frac{b}{c}\cdot\sin\delta & 1 \end{bmatrix} \cdot \begin{bmatrix} 1 & 0 & 0 \\ 0 & 1 & -\frac{c}{b}\cdot\tan\frac{\delta}{2} \\ 0 & 0 & 1 \end{bmatrix} \right]$$

Non-isotropic rotated three-dimensional image record

FIGURE 3

METHOD FOR ROTATING IMAGE RECORDS WITH NON-ISOTROPIC TOPICAL RESOLUTION

BACKGROUND OF THE INVENTION

The present invention relates to a method for rotating at least two-dimensional image records with non-isotropic topical resolution.

Known literature contains a number of methods for rotating and shifting image records. These methods can be roughly divided into two categories. In the first category, the rotations and translations of a record are computed exclusively in the image space. In the second, the rotations and translations are computed completely or partially in Fourier space with the aid of Fourier transformation.

The methods of the first category are disclosed in the following examples: Starting with an existing image record, a rotated image record is obtained by executing the following two steps: In the first step, the coordinate points of the rotated image record are computed by multiplying the coordinates of the existing image record by a rotation matrix. The value of each rotated coordinate point—this can be, for example, a matter of the percent value on a gray scale—is calculated in an interpolation process. A large number, more or less, of values of neighboring points of the existing image record, or all values, should be integrated into the interpolation process. The interpolations can be based on a Sinc interpolation, for instance. The following example should demonstrate that said interpolation processes entail a significant computing outlay. Assume a two-dimensional image with 256 pixels in two dimensions. This means that 65536 pixels must be rotated. In turn, this means that in the worst case for each of the 65536 pixels a respective interpolation must be performed with the same number of pixels. Altogether, this means a quite significant computing outlay and thus time outlay. For shifts of image records in accordance with methods of the first category, the steps described above for a rotation are performed accordingly.

The methods of the second category are exemplified next. There, Fourier transformation is specifically used to reduce the computing outlay. The Fourier transform F(k) of a one-dimensional image space function f(x) is generally defined as $$F(k) = \int_{-\infty}^{+\infty} f(x) \cdot e^{j \cdot 2 \cdot \pi \cdot k \cdot x} dx.$$

For the inverse-transformation, $$f(x) = \int_{-\infty}^{+\infty} F(k) \cdot e^{-j \cdot 2 \cdot \pi \cdot k \cdot x} dk.$$

As the central feature of the Fourier transformation, the displacement set is of primary importance in the methods of second category. The displacement set for a one-dimensional Fourier transformation is as follows:

$f(x-x_0)$ in the image space corresponds to $e^{j \cdot 2 \cdot \pi \cdot x_0 \cdot k} \cdot F(k)$ in Fourier space.

Applied to multidimensional applications, this means that a shift of an image record by a random vector is imaged in Fourier space in an additional phase of the Fourier transform. Unlike methods of the first category, interpolations are not required for the translation of an image record. The interpolation is completed on the basis of the attributes of Fourier transformation semi-automatically with the transformation into Fourier space, with the introduction of a desired additional phase and the corresponding back-transformation. Rotations of image records can likewise be performed with the aid of Fourier transformation and its displacement set without interpolation. To accomplish this, a rotation matrix describing the rotation is dismantled into a product of corresponding shear matrices. The effect of shear matrices is expressed in simple shifts of rows or columns of an image record, respectively. These shifts can be calculated easily in Fourier space with the aid of the Fourier transformation and its displacement set. A method of another kind is described in the essay by William F. Eddy, Mark Fitzgerald and Douglas C. Noll, "Improved Image Registration by Using Fourier Interpolation", MRM 36, pp. 923–931, 1996.

The case of a non-isotropic topical resolution, which is the more frequent case in many applications, can be handled by the above method of the second category only with additional outlay. Non-isotropic records are not problematic for methods of the first category. For example, in rotations an elliptical path is merely executed instead of a circular path. The high computing outlay for the necessary interpolations remains unchanged. In methods of the second category, the non-isotropic record must be converted into an isotropic auxiliary record in a first step. Then, a method of the second category can be applied. Finally, the record must be converted back into a non-isotropic record. These conversion processes, which are known as resampling processes, represent additional computing outlay, regardless of the type and manner of execution of the resampling processes. In practice, the registering of non-isotropic records is often avoided for these reasons.

SUMMARY OF THE INVENTION

It is thus an object of the invention to create a method which reduces the computing outlay in rotations and translations of non-isotropic image records.

This object is inventively achieved in accordance with the present invention in a method for rotating at least two-dimensional image records with non-isotropic topical resolution, said method comprising the steps of: describing a rotation of an image record using a rotation matrix; representing said rotation matrix as a product of at least two shear matrices, each shear matrix having at least one element that is dependent on the angle of said rotation and remaining elements which are exclusively zeroes and ones; multiplying a matrix element, which is dependent on said angle of said rotation, of at least one of said shear matrices by a factor; and performing said rotation of said image record in Fourier space without interpolations and without forming an isotropic auxiliary record, upon exploitation of a displacement set of the Fourier transformation by implementing said shear matrices as displacements of line elements of said image record.

In an embodiment, the present method provides the following steps:

describing a rotation of an image record with a rotation matrix;

representing the rotation matrix as a product of at least two shear matrices, each of which comprises exactly one element that is dependent on the angle of rotation, and whose remaining elements are exclusively zeroes and ones;

multiplying the matrix element, which depends on the angle of rotation, of at least one shear matrix by a factor; and performing the rotation of the image record in Fourier space, without interpolations and without forming an isotropic auxiliary record, by exploiting the displacement set of the Fourier transformation by implementing the shear matrices as displacements of line elements of the image record.

By simple one-time multiplications, by factors, of matrix elements of shear matrices that describe rotation intensive transformations of non-isotropic image records into isotropic auxiliary image records, corresponding back-transformations are made superfluous for the purpose of rotating non-isotropic image records in Fourier space. The application of the invention in a computer system reduces the necessary computing time.

In an advantageous embodiment, the factor depends exclusively on at least one ratio of a topical resolution in a first dimension to the topical resolution in a second dimension, which ratio describes a non-isotropic topical resolution. With the aid of a factor that is selected in this way, the error between the image record that is rotated as desired and the image record that is rotated by applying the method is minimized.

In a particularly advantageous embodiment, said error equals zero for two- or three-dimensional image records.

An advantageous embodiment relates to image records that are generated by a computer or MR tomography device. Here, the present invention can be advantageously employed particularly in the field of functional MR tomography, where the image records that are registered in a time series are rotated and displaced continuously for the purpose of motion correction.

These and other features of the invention(s) will become clearer with reference to the following detailed description of the presently preferred embodiments and accompanied drawings.

DESCRIPTION OF THE DRAWINGS

FIG. 3 is a flowchart of the method for a three-dimensional image record in accordance with the present invention.

DETAILED DESCRIPTION OF THE PRESENTLY PREFERRED EMBODIMENTS

Figures 1, 2:
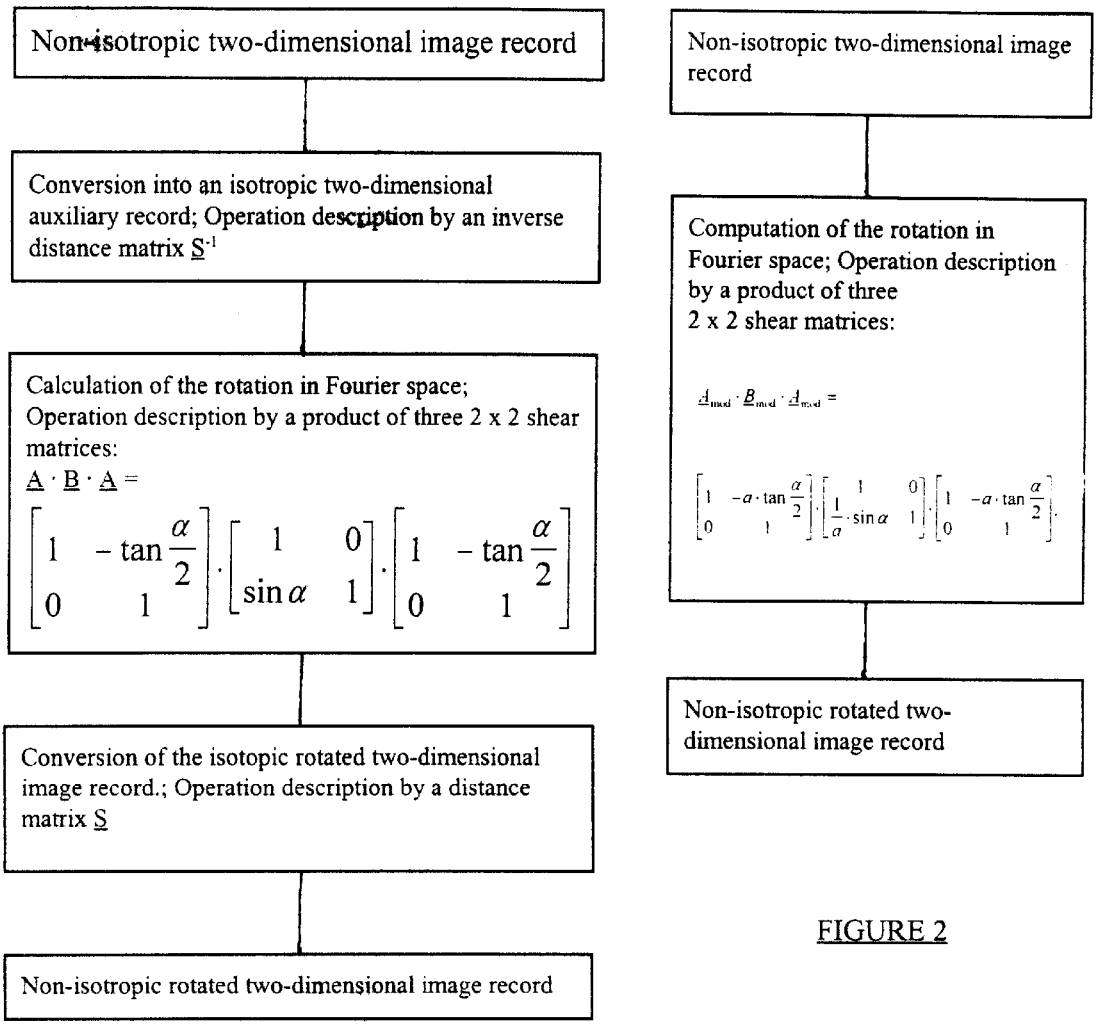
FIG. 1 is a flowchart of a method of the second category for a two-dimensional image record in accordance with the prior art.
FIG. 2 is a flowchart of the method for a two-dimensional image record in accordance with the present invention.

FIGS. 1 and 2 relate to a two-dimensional image record which consists of a definite number of pixels whose spatial arrangement is described by means of a cartesian coordinate system having two coordinate axes, for example, x and y. The spatial arrangement of a pixel is unambiguously determined by a particular coordinate point (x,y). The value of a pixel at the coordinate point (x,y) is unambiguously defined via the function f(x,y). Said value represents a gray value on a color scale, for instance. A factor a describes the relation of the topical resolution along the x axis to the topical resolution along the y axis. The image record is rotated about the origin of the coordinates by the angle $\alpha$.

As an exemplifying embodiment of the rotation of a two-dimensional record, FIG. 1 shows a flowchart for a method of the second category in accordance with the prior art. In a first step, an isotropic auxiliary record is generated from the non-isotropic image record. This operation is described by the inverse distance matrix $S^{-1}$. The inverse distance matrix $S^{-1}$ is defined as $$S^{-1} = \begin{bmatrix} 1 & 0 \\ 0 & 1/a \end{bmatrix}.$$

The isotropic auxiliary record undergoes the actual rotation. This is described by applying a rotation matrix R to each pixel. The rotation matrix R is defined as $$\underline{R} = \begin{bmatrix} \cos\alpha & -\sin\alpha \\ \sin\alpha & \cos\alpha \end{bmatrix}.$$

In order to be able to execute this rotation in Fourier space using the displacement set of the Fourier transformation, as described above, the rotation matrix R must be dismantled into a product of shear matrices. Between the shear matrices A and B and the rotation matrix R, the following relation abides:

$$R = A \cdot B \cdot A.$$

Here, the shear matrices A and B are defined as $$\underline{A} = \begin{bmatrix} 1 & -\tan\frac{\alpha}{2} \\ 0 & 1 \end{bmatrix} \text{ and } \underline{B} = \begin{bmatrix} 1 & 0 \\ \sin\alpha & 1 \end{bmatrix}.$$

Finally, the isotropic rotated auxiliary record is transferred back into the original non-isotropic topical resolution. This is described by application of the distance matrix S to the isotropic rotated auxiliary record.

Thus, the complete rotation process of the two-dimensional non-isotropic image record by an angle $\alpha$ by a method of the second category in accordance with the prior art is described by the following matrix operation:

$$S^{-1} \cdot A \cdot B \cdot A \cdot S.$$

Here, at least the processing of the actual rotation that is described by the matrix operation $R = A \cdot B \cdot A$ occurs in Fourier space.

FIG. 2 shows an exemplifying embodiment of the invention in a flowchart of the method of rotation of a two-dimensional image record. Here, the rotation of the non-isotropic image record is achieved without forming an isotropic auxiliary record by the exclusive application of a product of three shear matrices $A_{mod} \cdot B_{mod} \cdot A_{mod}$ to the image record. Here, the shear matrices $A_{mod}$ and $B_{mod}$ are defined as:

$$\underline{A}_{mod} = \begin{bmatrix} 1 & -a \cdot \tan\frac{\alpha}{2} \\ 0 & 1 \end{bmatrix} \text{ and } \underline{B}_{mod} = \begin{bmatrix} 1 & 0 \\ \frac{1}{a} \cdot \sin\alpha & 1 \end{bmatrix}.$$

The shear matrices $A_{mod}$ and $B_{mod}$ are characterized in that their element that depends on the angle of rotation is multiplied by the factor a and 1/a, respectively, relative to the shear matrices A and B. The application of the product of shear matrices $A_{mod} \cdot B_{mod} \cdot A_{mod}$ is calculated in Fourier space with the aid of the displacement set of the Fourier transformation.

FIG. 3 relates to a three-dimensional image record that consists of a definite number of pixels whose spatial arrangement is described by means of a cartesian coordinate system having three coordinate axes x, y and z. The spatial arrangement of a pixel is unambiguously determined by a particular coordinate point (x,y,z). The value of a pixel at the coordinate point (x,y,z) is unambiguously defined via a function f(x,y,z). Said value represents a gray value on a color scale, for instance. A factor b describes the relation of the topical resolution along the x axis to the topical resolution along the y axis, and a factor c describes the relation of the topical resolution along the x axis to the topical resolution along the z axis. The image record is rotated about the origin of the coordinates. In the three-dimensions, a random rotation about the origin is described by means of three subrotations about the three coordinate axes. A subrotation of the image record about the z axis is described by the angle $\beta$; about the y axis, by the angle $\gamma$; and about the x axis, by the angle $\delta$.

For an execution of the rotation in Fourier space using the displacement set of the Fourier transformation, the complete rotation process of a three-dimensional non-isotropic image record is thus described by the following matrix operation:

$$S_{3D}^{-1} \cdot R_{3D\beta} \cdot R_{3D\gamma} \cdot R_{3D\delta} \cdot S_{3D}.$$

Here, the subrotation matrices $R_{3D\beta}$, $R_{3D\gamma}$, and $R_{3D\delta}$ and the distance matrix $S_{3D}$ are defined as $$R_{3D\beta} = \begin{bmatrix} \cos\beta & -\sin\beta & 0 \\ \sin\beta & \cos\beta & 0 \\ 0 & 0 & 1 \end{bmatrix}, \quad R_{3D\gamma} = \begin{bmatrix} \cos\gamma & 0 & -\sin\gamma \\ 0 & 1 & 0 \\ \sin\gamma & 0 & \cos\gamma \end{bmatrix},$$

$$R_{3D\delta} = \begin{bmatrix} 1 & 0 & 0 \\ 0 & \cos\delta & -\sin\delta \\ 0 & \sin\delta & \cos\delta \end{bmatrix} \quad \text{and} \quad S_{3D} = \begin{bmatrix} 1 & 0 & 0 \\ 0 & b & 0 \\ 0 & 0 & c \end{bmatrix}.$$

Furthermore, the subrotation matrices $R_{3D\beta}$, $R_{3D\gamma}$, and $R_{3D\delta}$ can be represented as products of three respective shear matrices:

$$R_{3Dv} = A_{3Dv} \cdot B_{3Dv} \cdot A_{3Dv} \text{ with } v=\beta, \gamma, \delta.$$

The shear matrices $A_{3Dv}$ and $B_{3Dv}$ with $v=\beta, \gamma, \delta$ are defined as $$A_{3D\beta} = \begin{bmatrix} 1 & -\tan\frac{\beta}{2} & 0 \\ 0 & 1 & 0 \\ 0 & 0 & 1 \end{bmatrix}, \quad B_{3D\beta} = \begin{bmatrix} 1 & 0 & 0 \\ \sin\beta & 1 & 0 \\ 0 & 0 & 1 \end{bmatrix},$$

$$A_{3D\gamma} = \begin{bmatrix} 1 & 0 & -\tan\frac{\gamma}{2} \\ 0 & 1 & 0 \\ 0 & 0 & 1 \end{bmatrix}, \quad B_{3D\gamma} = \begin{bmatrix} 1 & 0 & 0 \\ 0 & 1 & 0 \\ \sin\gamma & 0 & 1 \end{bmatrix},$$

$$A_{3D\delta} = \begin{bmatrix} 1 & 0 & 0 \\ 0 & 1 & -\tan\frac{\delta}{2} \\ 0 & 0 & 1 \end{bmatrix}, \quad \text{and} \quad B_{3D\delta} = \begin{bmatrix} 1 & 0 & 0 \\ 0 & 1 & 0 \\ 0 & \sin\delta & 1 \end{bmatrix}.$$

In a method of the second category in accordance with the prior art, to rotate a non-isotropic three-dimensional record the following steps are performed: First, an isotropic auxiliary record is generated. This operation describes the inverse distance matrix $S_{3D}^{-1}$. Next, the actual rotation is conducted in Fourier space using the displacement set of the Fourier transformation. This operation is described by the product of the shear matrices $A_{3Dv} \cdot B_{3Dv} \cdot A_{3Dv}$ ($v=\beta, \gamma, \delta$). Last, the rotated isotropic auxiliary record is converted back into the non-isotropic original resolution. This operation describes the distance matrix $S_{3D}$.

In an exemplifying embodiment of the invention as illustrated in FIG. 3, the rotation of a non-isotropic three-dimensional image record is conducted without forming an auxiliary record. To derive this method, the abovementioned matrix operation is converted into $$S_{3D}^{-1} \cdot R_{3D\beta} \cdot R_{3D\gamma} \cdot R_{3D\delta} \cdot S_{3D} =$$
$$[S_{3D\beta}^{-1} \cdot R_{3D\beta} S_{3D\beta}] \cdot [S_{3D\gamma}^{-1} \cdot R_{3D\gamma} S_{3D\gamma}] \cdot [S_{3D\delta}^{-1} \cdot R_{3D\delta} S_{3D\delta}].$$

Here, subdistance matrices $S_{3D\beta}$, $S_{3D\gamma}$, and $S_{3D\delta}$ are defined as $$S_{3D\beta} = \begin{bmatrix} 1 & 0 & 0 \\ 0 & b & 0 \\ 0 & 0 & 1 \end{bmatrix}, \quad S_{3D\gamma} = \begin{bmatrix} 1 & 0 & 0 \\ 0 & 1 & 0 \\ 0 & 0 & c \end{bmatrix} \quad \text{and} \quad S_{3D\delta} = \begin{bmatrix} 1 & 0 & 0 \\ 0 & 1 & 0 \\ 0 & 0 & c/b \end{bmatrix}.$$

The complete rotation process of a three-dimensional non-isotropic image record is thus described by the following matrix operation:

$$[S_{3D\beta}^{-1} \cdot A_{3D\beta} \cdot B_{3D\beta} \cdot A_{3D\beta} \cdot S_{3D\beta}] \cdot$$
$$[S_{3D\gamma}^{-1} \cdot A_{3D\gamma} \cdot B_{3D\gamma} \cdot A_{3D\gamma} \cdot S_{3D\gamma}] \cdot [S_{3D\delta}^{-1} \cdot A_{3D\delta} \cdot B_{3D\delta} \cdot A_{3D\delta} \cdot S_{3D\delta}].$$

The rotation of a non-isotropic three-dimensional image record without forming an isotropic auxiliary record is achieved by exclusive application of a product of three products of three modified shear matrices in accordance with the following matrix operation:

$$[A_{3D\beta mod} \cdot B_{3D\beta mod} \cdot A_{3D\beta mod}] \cdot [A_{3D\gamma mod} \cdot B_{3D\gamma mod} \cdot A_{3D\gamma mod}] \cdot$$
$$[A_{3D\delta mod} \cdot B_{3D\delta mod} \cdot A_{3D\delta mod}].$$

Here, the modified shear matrices $A_{3Dvmod}$ and $B_{3Dvmod}$ ($v=\beta, \gamma, \delta$) are defined as $$A_{3D\beta mod} = \begin{bmatrix} 1 & -b \cdot \tan\frac{\beta}{2} & 0 \\ 0 & 1 & 0 \\ 0 & 0 & 1 \end{bmatrix}, \quad B_{3D\beta mod} = \begin{bmatrix} 1 & 0 & 0 \\ \frac{1}{b} \cdot \sin\beta & 1 & 0 \\ 0 & 0 & 1 \end{bmatrix},$$

$$A_{3D\gamma mod} = \begin{bmatrix} 1 & 0 & -c \cdot \tan\frac{\gamma}{2} \\ 0 & 1 & 0 \\ 0 & 0 & 1 \end{bmatrix}, \quad B_{3D\gamma mod} = \begin{bmatrix} 1 & 0 & 0 \\ 0 & 1 & 0 \\ \frac{1}{c} \cdot \sin\gamma & 0 & 1 \end{bmatrix},$$

$$A_{3D\delta mod} = \begin{bmatrix} 1 & 0 & 0 \\ 0 & 1 & -\frac{c}{b} \cdot \tan\frac{\delta}{2} \\ 0 & 0 & 1 \end{bmatrix}, \quad \text{and} \quad B_{3D\delta mod} = \begin{bmatrix} 1 & 0 & 0 \\ 0 & 1 & 0 \\ 0 & \frac{b}{c} \cdot \sin\delta & 1 \end{bmatrix}.$$

The shear matrices $A_{3Dvmod}$ and $B_{3Dvmod}$ ($v=\beta, \gamma, \delta$) are implemented in Fourier space using the displacement set of the Fourier transformation.

The modified shear matrices $A_{3Dvmod}$ and $B_{3Dvmod}$ ($v=\beta, \gamma, \delta$) derive from the shear matrices $A_{3Dv}$ and $B_{3Dv}$ ($v=\beta, \gamma, \delta$) in that their elements that depend on the angle of rotation are multiplied by the factors b and 1/b, or respectively, c and 1/c, or respectively, c/b and b/c.

Although modifications and changes may be suggested by those of ordinary skill in the art, it is the intention of the inventors to embody within the patent warranted hereon all changes and modifications as reasonably and properly come within the scope of their contribution to the art.

I claim as my invention:

1. A method for rotating at least two-dimensional image records with non-isotropic topical resolution, said method comprising the steps of:
   describing a rotation of an image record using a rotation matrix;
   representing said rotation matrix as a product of at least two shear matrices, each shear matrix having at least one element that is dependent on the angle of said rotation and remaining elements which are exclusively zeroes and ones;
   multiplying a matrix element, which is dependent on said angle of said rotation, of at least one of said shear matrices by a factor; and
   performing said rotation of said image record in Fourier space without interpolations and without forming an isotropic auxiliary record, upon exploitation of a displacement set of the Fourier transformation by implementing said shear matrices as displacements of line elements of said image record.

2. The method as claimed in claim 1, wherein said factor is dependent exclusively on at least one ratio of a topical resolution in a first dimension to a topical resolution in a second dimension, which ratio describes a non-isotropic topical resolution.

3. The method as claimed in claim 1,
   wherein said step of describing said rotation of said image record further comprises describing a rotation of a two-dimensional image record about an angle $\alpha$ using a 2×2 rotation matrix:
   $$\begin{bmatrix} \cos\alpha & -\sin\alpha \\ \sin\alpha & \cos\alpha \end{bmatrix};$$
   wherein said step of representing said rotation matrix further comprises representing a 2×2 rotation matrix as a product of three 2×2 shear matrices, said product comprising two identical upper 2×2 triangular matrices and a lower 2×2 triangle matrix, wherein main diagonal elements of said 2×2 matrices equal one:
   $$\begin{bmatrix} 1 & -\tan\frac{\alpha}{2} \\ 0 & 1 \end{bmatrix} \cdot \begin{bmatrix} 1 & 0 \\ \sin\alpha & 1 \end{bmatrix} \cdot \begin{bmatrix} 1 & -\tan\frac{\alpha}{2} \\ 0 & 1 \end{bmatrix}; \text{ and}$$
   wherein said step of multiplying said matrix element by a factor further comprises multiplying matrix elements of the 2×2 shear matrices that are dependent on said angle $\alpha$ by a factor a, which describes a ratio of a topical resolution in a first dimension to a topical resolution in a second dimension, said ratio being 1/a:
   $$\begin{bmatrix} 1 & -a\cdot\tan\frac{\alpha}{2} \\ 0 & 1 \end{bmatrix} \cdot \begin{bmatrix} 1 & 0 \\ \frac{1}{a}\cdot\sin\alpha & 1 \end{bmatrix} \cdot \begin{bmatrix} 1 & -a\cdot\tan\frac{\alpha}{2} \\ 0 & 1 \end{bmatrix}.$$

4. The method as claimed in claim 1,
   wherein said step of describing said rotation of said image record further comprises describing a rotation of a three-dimensional image record using a product of three 3×3 subrotation matrices that are expansions of a two-dimensional 2×2 rotation matrix, wherein rotation occurs by an angle $\beta$ about a cartesian coordinate axis of a third dimension, by an angle $\gamma$ of a cartesian coordinate axis of a second dimension, and by an angle $\delta$ about a cartesian coordinate axis of a first dimension:
   $$\begin{bmatrix} \cos\beta & -\sin\beta & 0 \\ \sin\beta & \cos\beta & 0 \\ 0 & 0 & 1 \end{bmatrix} \cdot \begin{bmatrix} \cos\gamma & 0 & -\sin\gamma \\ 0 & 1 & 0 \\ \sin\gamma & 0 & \cos\gamma \end{bmatrix} \cdot \begin{bmatrix} 1 & 0 & 0 \\ 0 & \cos\delta & -\sin\delta \\ 0 & \sin\delta & \cos\delta \end{bmatrix};$$
   wherein said step of representing said rotation matrix further comprises representing each 3×3 rotation submatrix as a product of three 3×3 shear matrices, each product comprising two identical upper 3×3 triangle matrices and one lower 3×3 triangle matrix, wherein main diagonal elements of said 3×3 triangle matrices equal one, and wherein remaining elements of said 3×3 triangle matrices include exactly one element that is dependent on an angle of a pertaining subrotation and are otherwise zero:
   $$\begin{bmatrix} 1 & -\tan\frac{\beta}{2} & 0 \\ 0 & 1 & 0 \\ 0 & 0 & 1 \end{bmatrix} \begin{bmatrix} 1 & 0 & 0 \\ \sin\beta & 1 & 0 \\ 0 & 0 & 1 \end{bmatrix} \begin{bmatrix} 1 & -\tan\frac{\beta}{2} & 0 \\ 0 & 1 & 0 \\ 0 & 0 & 1 \end{bmatrix},$$
   $$\begin{bmatrix} 1 & 0 & -\tan\frac{\gamma}{2} \\ 0 & 1 & 0 \\ 0 & 0 & 1 \end{bmatrix} \cdot \begin{bmatrix} 1 & 0 & 0 \\ 0 & 1 & 0 \\ \sin\gamma & 0 & 1 \end{bmatrix} \cdot \begin{bmatrix} 1 & 0 & -\tan\frac{\gamma}{2} \\ 0 & 1 & 0 \\ 0 & 0 & 1 \end{bmatrix}, \text{ and}$$
   $$\begin{bmatrix} 1 & 0 & 0 \\ 0 & 1 & -\tan\frac{\delta}{2} \\ 0 & 0 & 1 \end{bmatrix} \cdot \begin{bmatrix} 1 & 0 & 0 \\ 0 & 1 & 0 \\ 0 & \sin\delta & 1 \end{bmatrix} \cdot \begin{bmatrix} 1 & 0 & 0 \\ 0 & 1 & -\tan\frac{\delta}{2} \\ 0 & 0 & 1 \end{bmatrix}; \text{ and}$$
   wherein said step of multiplying said matrix element by said factor further comprises multiplying matrix elements, which are dependent on said angles $\beta$, $\gamma$, and $\delta$, of said 3×3 shear matrices by factors b, 1/b, c, 1/c, c/b, and b/c, wherein said factor b describes a relation of a topical resolution in said first dimension to a topical resolution in said second dimension, and wherein said factor c describes a relation of a topical resolution in said first dimension to a topical resolution in said third dimension:
   $$\begin{bmatrix} 1 & -b\cdot\tan\frac{\beta}{2} & 0 \\ 0 & 1 & 0 \\ 0 & 0 & 1 \end{bmatrix} \cdot \begin{bmatrix} 1 & 0 & 0 \\ \frac{1}{b}\cdot\sin\beta & 1 & 0 \\ 0 & 0 & 1 \end{bmatrix} \cdot \begin{bmatrix} 1 & -b\cdot\tan\frac{\beta}{2} & 0 \\ 0 & 1 & 0 \\ 0 & 0 & 1 \end{bmatrix},$$
   $$\begin{bmatrix} 1 & 0 & -c\cdot\tan\frac{\gamma}{2} \\ 0 & 1 & 0 \\ 0 & 0 & 1 \end{bmatrix} \cdot \begin{bmatrix} 1 & 0 & 0 \\ 0 & 1 & 0 \\ \frac{1}{c}\cdot\sin\gamma & 0 & 1 \end{bmatrix} \cdot \begin{bmatrix} 1 & 0 & -c\cdot\tan\frac{\gamma}{2} \\ 0 & 1 & 0 \\ 0 & 0 & 1 \end{bmatrix}, \text{ and}$$
   $$\begin{bmatrix} 1 & 0 & 0 \\ 0 & 1 & -\frac{c}{b}\cdot\tan\frac{\delta}{2} \\ 0 & 0 & 1 \end{bmatrix} \cdot \begin{bmatrix} 1 & 0 & 0 \\ 0 & 1 & 0 \\ 0 & \frac{b}{c}\cdot\sin\delta & 1 \end{bmatrix} \cdot \begin{bmatrix} 1 & 0 & 0 \\ 0 & 1 & -\frac{c}{b}\cdot\tan\frac{\delta}{2} \\ 0 & 0 & 1 \end{bmatrix}.$$

5. The method as claimed in claim 1, wherein said image records are generated by one of a computer and a MR tomography system.

* * * * *